June 8, 1948.  F. M. SLACK  2,443,152
LAWN MOWER SHARPENER
Filed May 27, 1947

INVENTOR.
Francis Marion Slack
BY Victor J. Evans & Co.
ATTORNEYS

Patented June 8, 1948

2,443,152

UNITED STATES PATENT OFFICE 2,443,152

LAWN MOWER SHARPENER

Francis Marion Slack, Pecos, Tex.

Application May 27, 1947, Serial No. 750,673

2 Claims. (Cl. 76—82.1)

1

The invention relates to a sharpener and more especially to a lawn mower sharpener.

The primary object of the invention is the provision of a sharpener of this character, wherein a holder is designed to accommodate a file which can be clamped therein, so that it can be employed, when drawn across the blades of the lawn mower cutter, for the sharpening thereof, the holder for the file being of novel construction and in the working thereof being guided by a tie rod of the frame of the lawn mower and also can be guided with respect to the stationary blade of the lawn mower for the sharpening of the same.

Another object of the invention is the provision of a sharpener of this character, wherein the hand file, which is of standard kind, is placeable within the holder, so that it will be handy for use in sharpening the blades of the cutting wheel and also the stationary blade coactive therewith, the said file being mounted in a novel manner and the holder being of novel construction.

A further object of the invention is the provision of a sharpener of this character which is extremely simple in its construction, thoroughly reliable and effective in its use, readily and easily handled, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing.

Similar reference characters indicate corresponding parts throughout the several views in the drawing.

Figure 1:
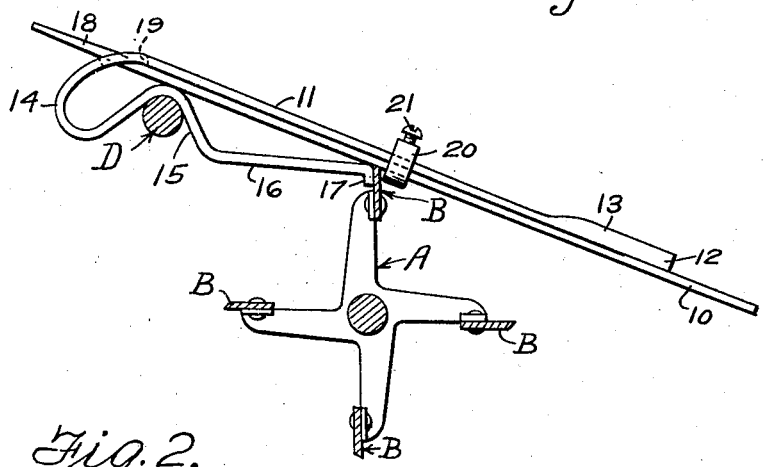
Figure 1 is a vertical transverse sectional view through a cutting wheel of a lawn mower and showing the sharpener constructed in accordance with the invention applied to one of its blades and supported by a cross tie rod of the frame of the lawn mower.
Figure 2:
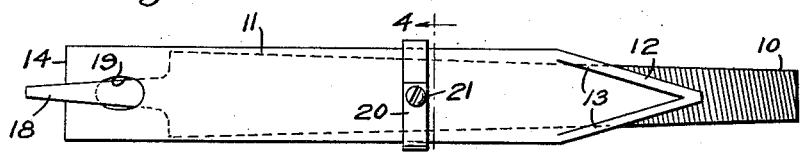
Figure 2 is a top plan view of the sharpener.
Figure 3:
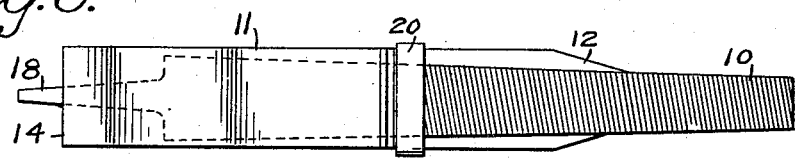
Figure 3 is a bottom plan view thereof.

Referring to the drawing in detail, A designates

2 generally a bladed cutting wheel of a lawn mower, its blades being indicated at B and of standard construction, while C is a portion of the stationary blade for coaction with the blades B of the wheel A in the use of the lawn mower, these parts, together with the cross tie rod D of the frame of the lawn mower, being shown merely to illustrate the application of the sharpener embodying the present invention and hereinafter fully described.

The sharpener comprises a holder for the steel file 10 of standard hand type and said holder comprises a flat body member 11 having an outwardly tapered end 12 with the raised V-shaped guiding edges 13 and an opposite curved loop-like end portion 14, the latter having an inverted V-shaped bight 15 and a terminal abutment extension 16, respectively, the bight 15 being adapted to provide a seat for accommodating the tie rod C when applying the sharpener and positioning it for use in sharpening the blades B of the wheel A. The extension 16 is provided with a guide rib 17 which rides upon one face of a blade B when the seat accommodates the tie rod D, as is clearly shown in Figure 1 of the drawing. The file 10 is placed longitudinally of the body member 11 to lie against the inner face thereof, with the handle tine 18 of said file passed through an opening 19 in the loop-like end portion 14, and such file 10 is held in this position through the medium of a clamping loop 20 which embraces the body member 10 and the said file and carries a binding screw 21 to fasten the file fixed with relation to the body member 11. This clamping loop 20 also functions as a guide for the sharpener when the same is applied as shown in Figure 1 of the drawing, the file being adapted to work upon the beveled cutting edge of the blade B next thereto and between the rib 17 and said clamping loop 20. It should be apparent that when the sharpener is moved longitudinally of the blade B acted upon by it, the said blade will be sharpened.

Figures 4, 5:
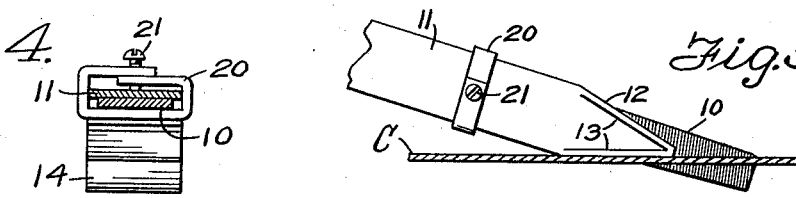
Figure 4 is a sectional view on the line 4—4 of Figure 2 looking in the direction of the arrows.
Figure 5 is a fragmentary sectional view through the stationary blade of the lawn mower, showing the sharpener in position for the sharpening of said blade.

In Figure 5 of the drawing the sharpener is shown positioned with relation to the stationary blade C, and the tapered end 12 with the guiding edge 13 riding upon the said blade C will locate the steel file 10 in sharpening position to the cutting edge of said stationary blade for the sharpening thereof.

The extension 16 has inherent resiliency, so that the end thereof with the guide rib 17 will contact with the steel file 10 when clamped in the holder.

What is claimed is:

1. A sharpener of the kind described comprising a flat body member having a tapered end and a curved loop-like opposite end, an inverted V-shaped bight formed in said loop-like end and forming a seat for a cross tie rod of a lawn mower, a terminal extension on the loop-like end and having a guide rib, a steel file fitted between the body member and said extension, and a loop clamp embracing the body member and said file to hold the same secured together and cooperating with the rib for guiding purposes.

2. A sharpener of the kind described comprising a flat body member having a tapered end and a curved loop-like opposite end, an inverted V-shaped bight formed in said loop-like end and forming a seat for a cross tie rod of a lawn mower, a terminal extension on the loop-like end and having a guide rib, a steel file fitted between the body member and said extension, and a loop clamp embracing the body member and said file to hold the same secured together and cooperating with the rib for guiding purposes, the said loop-like end being formed with an opening for accommodating a handle tine of said file.

FRANCIS MARION SLACK.